3,669,685
PREPARATION OF FRIED POTATO PRODUCTS
Merle L. Weaver, Martinez, and Earl Hautala, Richmond,
  Calif., assignors to the United States of America as
  represented by the Secretary of Agriculture
No Drawing. Continuation-in-part of application Ser. No.
  49,550, June 24, 1970. This application July 24, 1970,
  Ser. No. 58,186
Int. Cl. A23l 1/12
U.S. Cl. 99—103                                      7 Claims

ABSTRACT OF THE DISCLOSURE

The invention enables the production of fried products of desirable properties from raw stock which exhibits excessive browning tendencies and which would normally yield fried products of excessively dark color. Typically, pieces of raw potato are immersed for a short time in a liquid refrigerant (such as liquid nitrogen or dichlorodifluoromethane), leached with warm water, and fried in edible oil.

---

This is a continuation-in-part of our copending application Ser. No. 49,550, filed June 24, 1970, and now abandoned.

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of novel methods for producing fried potato products, e.g., French-fried potatoes, potato chips, shoestring potatoes, etc. Further objects of the invention will be evident from the following description wherein parts and percentages are by weight unless otherwise specified.

The preparation of fried potato products as generally carried out involves the following steps: Potatoes are washed and peeled, then cut into pieces such as strips or slices. The pieces are then fried in edible oil whereby to cook the potato tissues and to develop a desirable crispness and color. The products are finally salted and are ready for use or sale. Conventional antioxidants may also be applied where the products are not to be consumed soon after preparation.

Although the production of fried potato products is a relatively simple procedure, one very important problem repeatedly confronts the manufacturer, namely, the formation of products of acceptable and uniform color. This problem is brought about by variation in the chemical composition of the raw potatoes, and is explained as follows:

If the potatoes are freshly harvested or have been stored after harvest at a temperature of about 50° F. or above, no complications will generally occur. Under such circumstances, the raw pieces can be readily fried to yield a product of acceptable color. However, when the potatoes have been kept at the lower temperatures (that is, cold storage temperatures of about 40° F.) necessary for holding the tubers longer than about three months, complications set in. Potatoes held under such cold storage conditions tend to darken on frying to give products of very undesirable dark brown color, that is, products which are not marketable.

The reason why such potatoes tend to darken excessively can be explained as follows: When the potatoes are kept in cold storage, part of the starch in the tubers is converted into glucose or other reducing sugars. Thus it has been shown, for example, that the browning tendency of the tubers increases as the content of reducing sugars increases. It has also been postulated that the reducing sugars react with the nitrogenous constituents in the potatoes whereby to produce dark-colored reaction products. During the frying operation this browning reaction proceeds very rapidly at the high temperature to which the potatoes are subjected. It is to be emphasized, however, that regardless of the theory involved, it is well established that potatoes which have been kept in cold storage brown excessively on frying as discussed above.

A known method for remedying the situation outlined above involves "reconditioning" the potatoes which had been kept in cold storage. This reconditioning involves holding the potatoes at a temperature of about 70° F. for a period of about 1 to 3 weeks. The basis for the treatment is that during the holding period at the stated temperature, the content of reducing sugars is progressively decreased.

Although reconditioning is used in industry, it gives rise to its own problems and disadvantages. One item is that it is expensive as it involves extra handling costs, tying up of large quantities of potatoes, and added storage space and facilities for carrying out the treatment. Also, losses are involved e.g., losses in weight due to respiration (conversion of carbohydrate contents into $CO_2$), and losses due to sprouting and spoilage by microorganisms and/or insects or other pests. Another item is that some varieties (White Rose and Red La Soda, for example) do not respond to reconditioning; hence, if such potatoes have been subjected to cold storage they cannot be used at all.

An object of the invention is to provide the means for remedying the problems outlined above. A particular advantage of the invention is that is provides products of acceptable color even where the raw stock contains excessive amount of reducing sugar and would be unsuitable for use unless it were reconditioned prior to conversion to fried products. In other words, the invention enables the manufacturer to eliminate reconditioning treatments and thereby avoid all the problems and expense connected therewith. Another important advantage of the invention is that it enables the formation of fried products of desired properties from varieties which are normally unsuitable because of their inability to respond to reconditioning.

In a practice of the invention, raw potatoes are first subjected to the usual preliminary steps such as washing, peeling, and cutting into pieces. The pieces may be rinsed with water to remove surface particles but this is not critical.

The pieces of raw potato are then contacted with a liquid refrigerant which is at a temperature below 0° F., preferably below minus 20° F. Suitable for the purpose is liquid nitrogen which inherently exists at a temperature of about minus 320° F. One may also use any of the fluorocarbons which exist in the liquid state when cooled to the temperature selected for the treatment. Typical fluorocarbons which may be used in accordance with the invention are listed in the following table.

| Solvent | Formula | Boiling point °F. | °C. |
|---|---|---|---|
| Tetrafluoromethane | $CF_4$ | −198.4 | −128.0 |
| Trifluoromethane | $CHF_3$ | −115.7 | −82.1 |
| Trifluoromonochloromethane | $CClF_3$ | −114.6 | −81.4 |
| Hexafluoroethane | $CF_3-CF_3$ | −108.8 | −78.2 |
| Trifluoromonobromomethane | $CBr_2F_2$ | −72.0 | −57.8 |
| Difluoromonochloromethane | $CHClF_2$ | −41.4 | −40.8 |
| Pentafluoromonochloroethane | $CClF_2-CF_3$ | −37.7 | −38.7 |
| Difluorodichloromethane | $CCl_2F_2$ | −21.6 | −29.8 |
| 1,1-difluoroethane | $CH_3-CHF_2$ | −11.2 | −24.0 |
| Symmetrical tetrafluorodichloroethane | $CClF_2-CClF_2$ | 38.4 | 3.6 |
| Monofluorodichloromethane | $CHCl_2F$ | 48.1 | 8.9 |
| Monofluorotrichloromethane | $CCl_3F$ | 74.8 | 23.8 |
| Octafluorocyclobutane | | 21.1 | −6.0 |

Particularly preferred is the use of dichlorodifluoromethane since this compound can be effectively used at about its boiling point (minus 21.6° F.) so that its temperature is easily maintained at a uniform level. The loss of the compound by vaporization is prevented by positioning a refrigerated coil above the vessel in which it is contained, whereby the vapors of dichlorodifluoromethane are condensed to the liquid form which drips back into the vessel.

The step of contacting of the refrigerant with the potato pieces may be effectuated by dipping the pieces in a pool of the refrigerant, or by spraying the refrigerant on them. In any case, the time of contact is limited so that only the surface layers of the pieces become frozen. The contact should not be maintained long enough to cause the pieces to crack. The time required to achieve the desired end will vary depending on such factors as the solids content of the tubers, the temperature of the refrigerant, etc. In any particular case, the proper time can be determined by conducting pilot trials. In typical runs, we have attained good results by dipping potato strips in the cold liquid refrigerant for periods of about 3 to 30 seconds. A particular advantage accruing from the use of dichlorodifluoromethane at a temperature approximately equal to its boiling point (for example, minus 21.6° to minus 30° F.) is that the contact time need not be rigorously regulated. For example, if the contact time happens to be extended a few seconds past the time required to achieve surface freezing, cracking of the pieces rarely occurs.

After the contact with the refrigerant described above, the potato pieces are immediately leached with warm (about 120–150° F.) water for a period of about 1 to 5 minutes. The leaching may be carried out, for example, by immersing the potato pieces in the warm water, or by spraying or flooding the warm water over the pieces.

The potato pieces are then removed from the warm water bath and fried in edible oil in conventional manner.

The critical item of the process of the invention is the combination of the steps of surface-freezing and warm-water treatment described above. These steps are believed to exert a beneficial effect by causing a breakdown of the cells at and near the surface of the pieces, followed by removal of the soluble material (including reducing sugars) released from these damaged cells. Thereby, when the hot oil is applied (in the frying step) only a desired degree of color development takes place. In other words, the excessive browning which would normally take place is prevented or at least substantially lessened. It is to be emphasized, however, that regardless of the theory involved we have demonstrated that our process is effective, hence the invention is not to be limited to any particular theory or mechanism of action.

Hereinabove, it has been explained that in the surface freezing operation the potato pieces are contacted with a very cold liquid refrigerant. We have observed that other techniques of freezing cannot be substituted for this operation. For example, if one conducts the freezing step with a cold blast of air (as in a blast freezer conventionally used for rapid freezing of food products) there is only a partial improvement in color (when the pieces are fried) and the products have an undesirable mushy texture.

A feature of the invention is that the refrigerant applied in the freezing step is wholly volatile whereby it is completely dissipated when the potato pieces are subsequently warmed as they contact the warm water in the leaching step. Since the refrigerant is thus removed from the potato pieces, there is no alteration of the natural flavor of the products.

EXAMPLES

The invention is further demonstrated by the following illustrative examples. Some of the runs (C through I, K, L, O, P, R, S, U, and V) are not representative of the invention but are included for the purpose of comparison.

Example 1

The potatoes used in this example were of the Red La Soda variety which had been held in cold storage about 6–7 months and were used without applying any reconditioning treatment.

The potatoes were washed, peeled, and cut into strips ⅜" x ⅜" in cross-section) as for French frying. The strips were divided into several batches, which were treated as described below.

In one run (A) the potato strips were immersed in liquid nitrogen for 15 seconds, removed and immediately placed in a bath of water maintained at 122° F. After holding them in the warm water for 3 minutes the pieces were removed, drained, and fried in edible oil 4 minutes at about 375° F.

In run B the procedure of run A was followed with the single exception that the soak in warm water was for 5 minutes.

In runs C and D the freezing step was omitted. The strips were given a soak in warm water (run C, 3 minutes; run D, 5 minutes), then fried in same manner as described.

In run E, both the freezing and the soaking steps were omitted. The strips were fried directly in the manner as described.

In runs F through I, the freezing step was conducted by treatment in a blast freezer wherein the strips were exposed to a strong blast of air at minus 30° F. After exposure to this refrigerated air blast for different periods, the products were soaked in warm water (122° F.) for 5 minutes, removed from the water, drained, and fried as previously described.

All the resulting batches of French-fried potatoes were then examined for color, appearance (uniformity of color), and texture. With regard to the last item, it may be noted that good quality French-fried potatoes have a crisp exterior and a mealy interior. The color was gauged by comparison with a set of color standards used in the industry: USDA Color Standards for Frozen French Fried Potatoes, #64–1, 2nd ed. 1966, Munsell Color Co., Inc., Baltimore, Md. The standard colors are numbered 0 to 4, with the higher numbers indicating darker color. Products generally regarded as acceptable in the trade are those which exhibit colors 1 or 2; products of color less than 1 are too light; those of color higher than 2 are too dark.

The treatments applied and the results obtained are summarized in the following table.

TABLE I

| Run | Treatment Freezing step | Treatment Warm water soak | Color No. | Appearance* | Texture Exterior | Texture Interior |
|---|---|---|---|---|---|---|
| A | Liq. N₂ dip | Yes (3 min.) | 2.0 | U | Crisp | Mealy. |
| B | do | Yes (5 min.) | 2.0 | U | do | Do. |
| C | Not used | Yes (3 min.) | 3.5 | U | do | Do. |
| D | do | Yes (5 min.) | 3.0 | U | do | Do. |
| E | do | Not used | 4+ | U | do | Do. |
| F | Air blast (5 min.) | Yes (5 min.) | 2.5 | U | do | Do. |
| G | Air blast (10 min.) | do | 2.5 | M | Leathery | Mushy. |
| H | Air blast (15 min.) | do | 2.5 | M | do | Do. |
| I | Air blast (20 min.) | do | 2.5 | M | do | Do. |

*Uniform appearance designated U; mottled appearance designated M.

It is evident from an inspection of Table I that runs A and B in accordance with the invention provided products of proper color and other properties. Omission of the freezing step (runs C and D) or both freezing and warm-water soak (run E) yielded unacceptable products.

Runs F through I demonstrate that although an air blast freezer treatment provides some benefit, it is not adequate to form a satisfactory product.

Example 2

The potatoes used in this example were of the Burbank Russet variety which had been held in cold storage about 6 months, and which were used without applying any reconditioning treatment.

The potatoes were washed, peeled, and cut into strips 3/8" x 3/8" in cross-section. The strips were then divided into several batches which were treated as described below.

In one run (J), the potato strips were immersed in liquid nitrogen for 15 seconds, removed and immediately placed in a bath of warm (122° F.) water. After holding them in the warm water for 3 minutes, the slices were removed, drained, and fried in edible oil 4 minutes at about 375° F.

In run K the treatment with liquid $N_2$ was omitted. In run L both the treatment with liquid $N_2$ and the warm water soak were omitted.

All the batches of French-fried potatoes were then assayed as described in Example 1. The conditions applied and the results obtained are summarized below.

TABLE II

| Run | Treatment Freezing step | Treatment Warm water soak | Color No. | Appearance¹ | Texture² |
|---|---|---|---|---|---|
| J | Liq. N₂ dip | Yes (3 min.) | 1 | U | CM |
| K | Not used | do | 3.5 | U | CM |
| L | do | Not used | 4+ | U | CM |

¹ Uniform appearance designated U.
² Crisp exterior and mealy interior designated CM.

Example 3

In these runs the refrigerant used was dichlorodifluoromethane, hereinafter abbreviated as DDM.

The potatoes used in this example were of the Red La Soda or Norchip variety which had been held in cold storage about 7 months and were used without applying any reconditioning treatment.

The potatoes were washed, peeled, and cut into strips 3/8" x 3/8" in cross-section. The strips were divided into several batches which were treated as described below.

In one run (M), the potato strips were immersed in a bath of DDM at minus 1° F. for a period of 3 seconds. The strips were then removed and immediately placed in a bath of warm (150° F.) water. After holding them in the warm water for 5 minutes, the strips were removed, drained and fried in edible oil 4 minutes at about 375° F.

The other runs were carried in the same manner, with the exceptions noted below:

In run N the dip in DDM was for 5 seconds.

In run O the dip in DDM was omitted, and in run P both the dip in DDM and the warm water treatment were omitted.

In runs Q and T the refrigerant (DDM) was held at a temperature, minus 23° F., close to its boiling point (minus 21.6° F.). The time of the dip was 15 seconds.

In the remainder of the runs, the refrigerant dip and/or the warm water treatment were omitted.

All the fried products were assayed for color, appearance, and texture, as described above in Example 1.

The conditions applied and the results obtained are summarized in Tables III, IV, and V below.

TABLE III

Variety: Red LaSoda. Temperature of refrigerant (dichlorodifluoromethane): Minus 110° F.

| Run | Time in refrigerant, sec. | Time in warm (120° F.) water, min. | Color No. | Appearance¹ | Texture² |
|---|---|---|---|---|---|
| M | 3 | 5 | 1.5 | U | CM |
| N | 5 | 5 | 1.5 | U | CM |
| O | (³) | 5 | 3.5 | U | CM |
| P | (³) | (³) | 4.0 | U | CM |

¹ Uniform appearance designated U.
² Crisp exterior and mealy interior designated CM.
³ Not used.

TABLE IV

Variety: Red LaSoda. Temperature of refrigerant (dichlorodifluoromethane): Minus 23° F.

| Run | Time in refrigerant, sec. | Time in warm (120° F.) water, min. | Color No. | Appearance¹ | Texture² |
|---|---|---|---|---|---|
| Q | 15 | 5 | 1.0 | U | CM |
| R | (³) | 5 | 3.0 | U | CM |
| S | (³) | (³) | 4.0 | U | CM |

¹ Uniform appearance designated U.
² Crisp exterior and mealy interior designated CM.
³ Not used.

TABLE V

Variety: Norchip. Temperature of refrigerant (dichlorodifluoromethane): Minus 23° F.

| Run | Time in refrigerant, sec. | Time in warm (120° F.) water, min. | Color No. | Appearance¹ | Texture² |
|---|---|---|---|---|---|
| T | 15 | 5 | 1.0 | U | CM |
| U | (³) | 5 | 2.5 | M | CM |
| V | (³) | (³) | 4.0 | U | CM |

¹ Uniform appearance designated U; mottled appearance designated M.
² Crisp exterior and mealy interior designated CM.
³ Not used.

Having thus described the invention, what is claimed is:

1. A process for preparing fried potato products which comprises:
   (a) contacting pieces of raw potato with a liquid refrigerant maintained at a temperature below 0° F. for a limited period of time so that essentially only surface layers of the pieces are frozen,
   (b) without delay, leaching the so-treated potato pieces with warm water for a period of about 1 to 5 minutes, and
   (c) frying the resulting potato pieces in edible oil.

2. A process for producing fried potato products of desirable properties from potatoes which exhibit excessive browning tendencies and which would normally produce fried products of an excessively dark color, which comprises
  (a) providing pieces of raw potato which exhibit said excessive browning tendencies,
  (b) immersing said pieces in a liquid refrigerant at a temperature below minus 20° F. for a limited period of time so that essentially only surface layers of the pieces are frozen,
  (c) without delay leaching the so-treated pieces with warm water for a period of about 1 to 5 minutes, and
  (d) frying the resulting treated pieces in edible oil.

3. The process of claim 2 wherein the refrigerant is liquid nitrogen.

4. The process of claim 2 wherein the refrigerant is a fluorocarbon.

5. The process of claim 2 wherein the refrigerant is dichlorodifluoromethane.

6. The process of claim 2 wherein the refrigerant is dichlorodifluoromethane, maintained at approximately its boiling point.

7. The process of claim 2 wherein the refrigerant is maintained at a temperature not lower than about minus 30° F.

References Cited

UNITED STATES PATENTS

| 3,368,363 | 2/1968 | Alaburda et al. | 99—198 |
| 3,592,666 | 7/1971 | Butler | 99—198 X |

OTHER REFERENCES

Talburt et al., "Potato Processing," AVI Publishing Co., Westport, Conn., 1967, pp. 351 & 352; Copy in Gr. 170.

S. LEON BASHORE, Primary Examiner

F. FREI, Assistant Examiner

U.S. Cl. X.R.

99—100 P, 193, 198